United States Patent [19]

Mei et al.

[11] Patent Number: 5,319,981
[45] Date of Patent: Jun. 14, 1994

[54] DIFFERENTIAL PRESSURE DEVICE

[75] Inventors: Daniel L. Mei, Port Hueneme, Calif.; Peter C. Tack, Basingstoke, England

[73] Assignee: Gulton-Statham Transducers, Inc., Costa Mesa, Calif.

[21] Appl. No.: 4,481

[22] Filed: Jan. 12, 1993

Related U.S. Application Data

[63] Continuation of Ser. No. 680,970, Apr. 5, 1991, abandoned.

[51] Int. Cl.$^5$ .............................. G01L 7/08; G01L 9/06
[52] U.S. Cl. .......................................... 73/706; 73/708; 73/721; 338/4
[58] Field of Search ................. 73/706, 708, 721, 720, 73/861.42, 861.52; 338/4

[56] References Cited

U.S. PATENT DOCUMENTS

| | | | |
|---|---|---|---|
| 4,285,244 | 8/1981 | Green | 73/706 |
| 4,329,877 | 5/1982 | Hershey | 73/706 |
| 4,841,776 | 6/1989 | Kawachi et al. | 73/706 |

Primary Examiner—Donald O. Woodiel
Attorney, Agent, or Firm—Townsend and Townsend Khourie and Crew

[57] ABSTRACT

A pressure sensing transmitter is provided that has high overpressure protection. The transmitter includes an housing having a first cell, a second cell, a sensing chamber, first and second pressure signal receiving means, and a differential sensor chip for measuring the pressure differential between the first and second pressure signal receiving means. Each cell further includes a cylinder with a clearance of an overpressure diaphragm mounted on the housing, an isolation diaphragm mounted on the other face, and a channel coupling the overpressure and isolation diaphragm and further coupling one cell to the first pressure signal receiving means and the other cell to the second pressure signal receiving means. Each overpressure diaphragm is positioned such that an overpressure protection cavity is formed between it and the housing. The first cell cavity is further coupled to the second pressure signal receiving means and the second cell cavity is further coupled to the first pressure signal receiving means. This arrangement allows a predetermined absolute pressure applied against one of the isolation diaphragms, subsequently transmitted to the sensing chamber via one of the pressure signal receiving means, to collapse an appropriate overpressure diaphragm to relieve one of the pressure signal receiving means of the excess pressure.

51 Claims, 3 Drawing Sheets

DIFFERENTIAL PRESSURE DEVICE

This is a continuation of application Ser. No. 07/680,970, filed Apr. 5, 1991, now abandoned.

BACKGROUND OF THE INVENTION

The present invention relates generally to pressure sensing devices, and more specifically, to differential/static pressure sensing devices having high excess pressure protection.

Differential pressure transducers, or transmitters, using a sensor which have only a small displacement over their operating range are well-known in the art as shown in U.S. Pat. No. 3,712,143 issued to Weaver et al. In such a transmitter, the sensor is typically a strain-sensitive semiconductor chip with means for applying presurized fluids to respective sides of the wafer to produce a physical displacement of the wafer in response to a differential pressure of the fluids. Such differential pressure transmitters include a pair of barrier diaphragms being pressurized with a second input fluid having a second pressure.

A respective interior chamber on the other side of each of the barrier diaphragms contains a respective substantially incompressible fill fluid. These fill fluids communicate through fluid passages with opposite respective sides of the sensor chip, and the chip is displaced or deflected by an amount which is dependent upon the difference between the two pressures of the fill fluids. The sensor chip, in turn, produce an electrical output signal which is dependent upon the displacement and, hence, is representative of a differential pressure of the fill fluids which, in turn, is dependent on the differential pressure of the input fluids.

Such transmitters have usually incorporated pressure overload protection means to prevent the sensor chips from being excessively displaced by overload input differential pressures which could damage the sensor chip. Such overload protection means have been based on providing equal or similar overload protection in both directions of displacement of the sensor wafer.

Another method, as disclosed in U.S. Pat. No. 4,572,000, issued to Kooiman, is the use of sensing diaphragms that are flat when an excessive pressure is applied thereto. Such diaphragms are formed from silicon, quartz, sapphire or other substantially nonhysteretic, brittle, nonmetal.

Yet another method, disclosed in U.S. Pat. No. 4,173,149, issued to Critten et al., uses overload diaphragms that are concavo-convex shaped and are stiff over a given working range, but collapse over a relatively short, high pressure range. Each diaphragm collapses against a housing structure that ultimately bears the excess pressure, thus relieving the pressure sensor. Also included are blocks of material having a low coefficient of thermal expansion relative to the housing material to accommodate increased temperature swings which might distort any pressure readings.

SUMMARY OF THE INVENTION

According to the invention, a pressure sensing transmitter is provided that has high overpressure protection. The transmitter includes an housing having a first cell, a second cell, a sensing chamber, first and second pressure signal receiving means, and a differential sensor chip for measuring the pressure differential between the first and second pressure signal receiving means.

Each cell includes a cylinder with an isolation diaphragm mounted on one face and a concave spherical profile on the other face. An overpressure diaphragm is mounted on the main body and nests into the concave spherical profile on the cylinder. The spherical overpressure diaphragms act as moveable barriers between the cells on each side of the device. Each cell further includes channels coupling the overpressure and isolation diaphragms, and further coupling one cell to the first pressure signal receiving means and the other cell to the second pressure signal receiving means.

Each overpressure diaphragm is positioned such that an overpressure protection cavity is formed between it and the housing. The first cell cavity is further coupled to the second pressure signal receiving means and the second cell cavity is further coupled to the first pressure signal receiving means. This arrangement allows a predetermined absolute pressure applied against one of the isolation diaphragms, subsequently transmitted to the sensing chamber via one of the pressure signal receiving means, to collapse an appropriate overpressure diaphragm, shifting the excess pressure from the pressure signal means to the housing. The transfer of pressure to the housing relieves the sensor transducers from the excess pressure.

The overpressure diaphragm, which is spherical, and the isolation diaphragm, which is convoluted with annulus ridges, exhibit non-linear characteristics that allow for a wide temperature operating band and a standard non-pressurized ambient temperature silicon-oil-filled procedure. In addition, the relative small oil volume required for full scale output by the differential sensor chip allows for a relatively fast response time.

The invention will now be described, by way of example, with reference to the accompanying drawings.

DETAILED DESCRIPTION OF THE PREFERRED EMBODIMENT

Figure 1B:
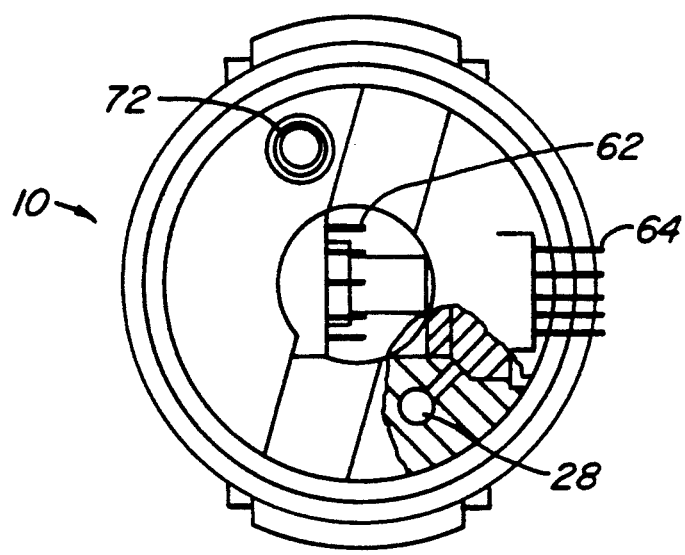
FIG. 1B is a partial cutaway of the device along the line B—B of FIG. 1A.
Figure 1A:
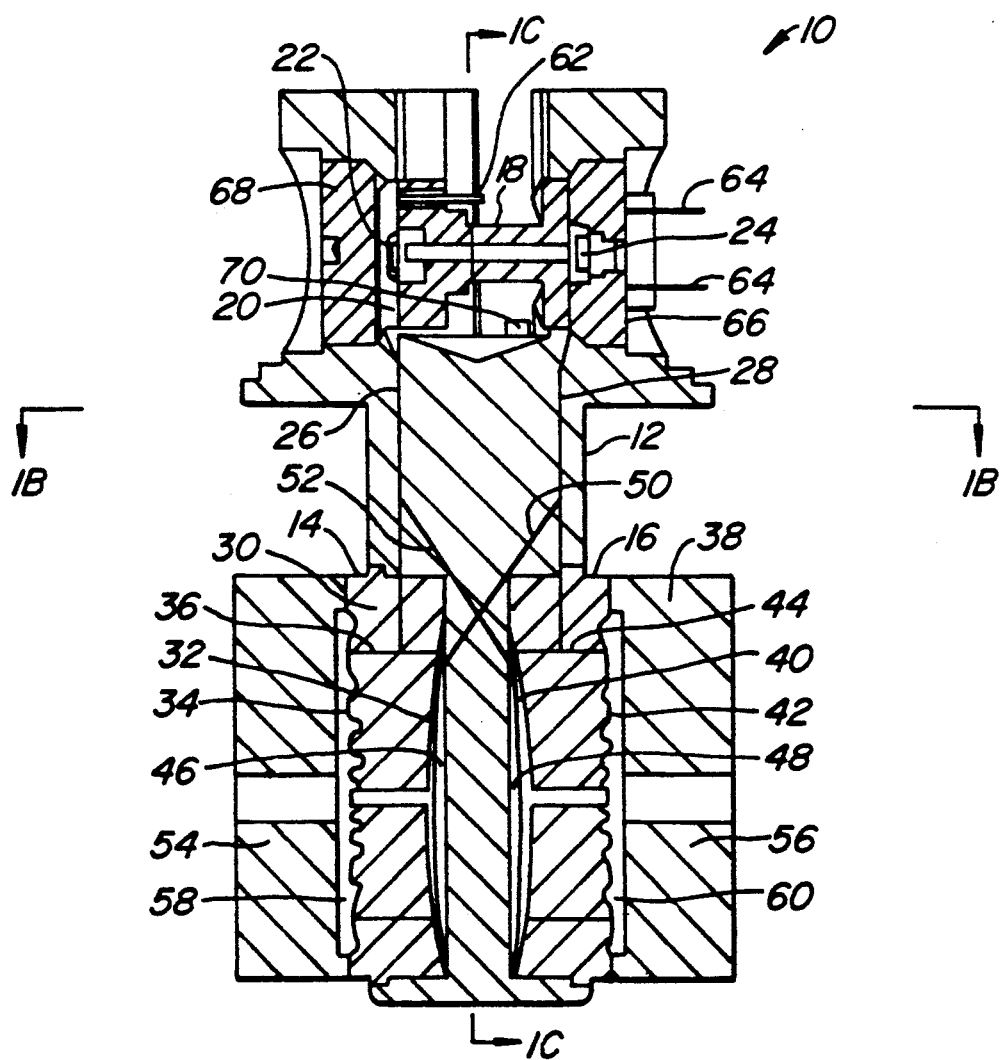
FIG. 1A is a cross-sectional view of a differential pressure device according to the invention.

FIG. 1A is a cross-sectional view of a differential pressure transmitter 10. The transmitter includes a housing 12 which houses a first cell 14 on one side and a second cell 16 on the other. Located in the top portion of housing 12 is a sensor chamber 18 wherein a differential assembly 20 is mounted. Inside the differential assembly 20 is a differential sensor chip 22 and an absolute pressure chip 24. Each cell is connected to sensor chamber 18 via a port 26 for first cell 14 and a port 28 for second cell 16.

First cell 14 is further composed of a cylinder 30, having a spherically concave face on one side of cylinder 30 to clear a spherically shaped overpressure diaphragm 32 welded to housing 12, and a convolutely-shaped isolation diaphragm 34 mounted to conform to a like-convoluted face on the other side. Cylinder 30 further includes a channel 36 for allowing fluid communication between the two diaphragms and is further connected to port 26. Second cell 16 is identical to first cell 14 with cylinder 38, overpressure diaphragm 40, isolation diaphragm 42, and channel 44 identifying the appropriate parts.

Each cylinder 30 and 38 is mounted to housing 12 but not touching overpressure diaphragms 32 and 40. In addition, each surface of housing 12 at the boundary is spherically concave, thereby forming overpressure cavities 46 and 48. Each cavity 46 and 48 allows its respective diaphragm 32 and 40 to conform to the surface of either side as the diaphragm moves under pressure. Each cavity 46 and 48 on the housing side of the diaphragm is in communication with port 28 and 26, respectively, via a relief channel 50 and 52, respectively.

Each diaphragm is welded to its cylinder along its periphery with each cylinder subsequently welded to housing 12 along its periphery. Such welds form airtight seals that are leak-proof under great pressure and/or temperature extremes that transmitter 10 might encounter. Subsequently, a pair of pressure caps 54 and 56 are either bolted together or welded to each cylinder 30 and 38 to protect isolation diaphragms 3 and 42. Each pressure cap 54 and 56 is recessed on its inner face to allow for a displacement cavity 58 and 60. Each pressure cap 54 and 56 also has an opening to allow the outside environment pressure to act on the outside surface of each isolation diaphragm 34 and 42.

Housing 12, cylinder 30 and 38, differential assembly 20, and pressure cap 54 and 56 are made of a high grade, machinable metal such as aluminum or stainless steel, preferably of 316 stainless steel.

Each cell assembly, which includes a cylinder with channels, one diaphragm, and a port, is filled with an incompressible, high pressure and temperature fluid, such as silicon oil. Furthermore, the fluid in each cell assembly is separated from the other cell assembly by the barrier of each overpressure diaphragm and by the differential pressure sensor chip. A first pressure acting on one of the isolation diaphragms is transmitted through the silicon oil to differential sensor chip 22, and a second pressure acting on the other isolation diaphragm is transmitted through the silicon oil to the other side of differential sensor chip 22. The pressure difference of the two pressures acting on sensor chip 22 is converted into an electrical signal which is transmitted to an output device (not shown) attached at a set of differential pressure sensor pins 62.

One of the cell assemblies communicates its pressure to an absolute pressure sensor chip 24. The pressure is converted to an electrical signal and transmitted to a second output device (not shown) attached at a set of absolute pressure sensor pins 64.

Differential assembly 20, which houses the two sensor chips, is secured in place in chamber 18 by a plug ring 66 and a dummy plug 68. In a specific embodiment, plug ring 66 holds absolute pressure sensor chip 24 with absolute sensor pins 64 extending outward to allow outside connection to the second output device. Both plug ring 66 and dummy plug 68 are secured to housing 12 by welds along both the inner and outer periphery to seal both sensor chips from the outside environment and to prevent leakage of the transmission fluid.

Each pressure sensor is a monolithic strain gage with circuits implanted into single crystal silicon. Strain sensitive resistive elements, arranged in the pattern of a four-active arm Wheatstone bridge, are ion implanted in the silicon strain gage (see FIG. 2D). As pressure is applied to the silicon diaphragm, the piezoresistive influence produces a change in resistance in the strain-sensor arms of the bridge.

Two of the bridge arms are located in a region where the strain will be tensile; the other two in a region where the strain will be compressive. Tension increases the resistance of an arm; compression reduces it. The overall effect of a pressure-induced strain is a change in resistance. The output is then conditioned within a set of integral amplifiers (not shown) to produce independent linear-to-static pressure and differential pressure output signals.

A temperature sensor 70 can be located in close proximity to the pressure sensors in chamber 18. Temperature sensor 70 may be used to provide improved correction of thermal errors.

FIG. 1B illustrates the top of pressure transmitter 10. Two oil fill holes 72 and 74 are located on the top to allow the silicon oil used to be filled into housing 12 in order to fill both cell assemblies. Each fill hole 72 and 84 is partially threaded to allow a set screw to hold a ball seal in place. Such a closure assembly guarantees a hermetic seal that will not allow outside pressure to penetrate into the cells nor to allow any oil to leak past the ball seal. A partial cut-away view shows how port 28 connects to differential assembly 20.

Figure 1C:
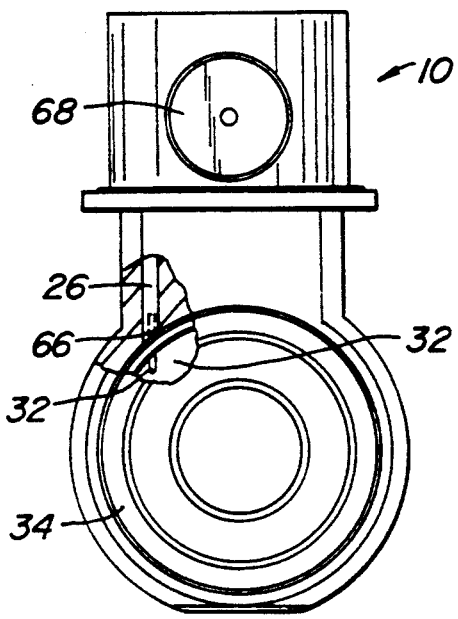
FIG. 1C is a partial cutaway of the device along the line C—C of FIG. 1A.

FIG. 1C is a partial cut-away side view of pressure transmitter 10 without a pressure cap. The cut-away portion exposes how relief channel 52 connects port 26 to overpressure cavity 48. Referring to FIGS. 1A and 1C, relief channel 50 similarly connects port 28 to overpressure cavity 46. Also shown is how the convolutions on isolation diaphragm 34 form concentric rings or annuluses.

Figure 2A:
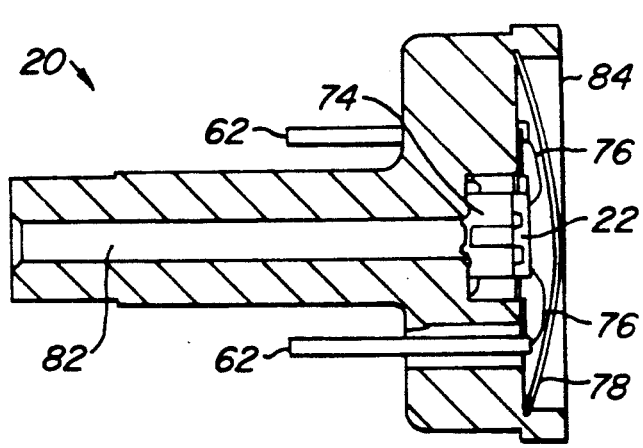
FIG. 2A is a cross-sectional side view of a differential assembly as found in FIG. 1A.
Figure 2B:
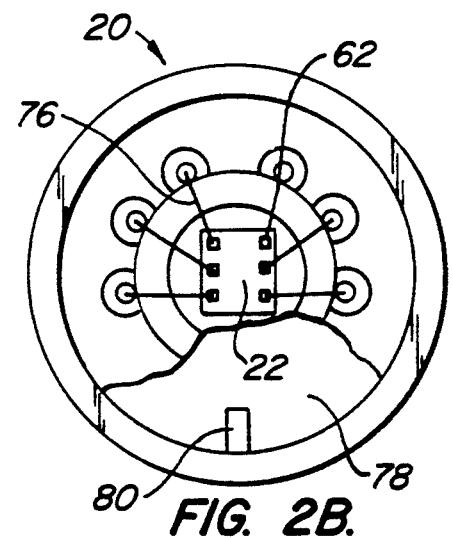
FIG. 2B is a partial cutaway front view of the differential assembly as found in FIG. 2A.
Figure 2C:
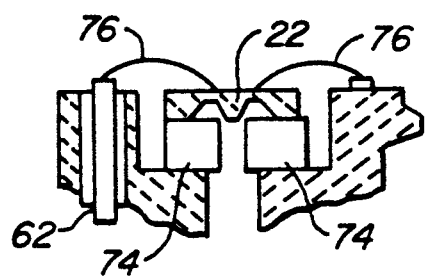
FIG. 2C is a cross-sectional view of the differential pressure sensor as found in FIG. 2A.
Figure 2D:
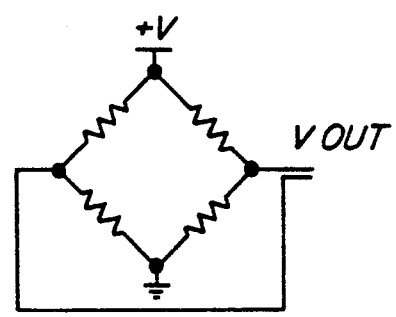
FIG. 2D is a schematic diagram of the differential pressure sensor as found in FIG. 2C.

A cross-sectional side view of differential assembly 20 is shown in FIG. 2A with a partial cut-away front view shown in FIG. 2B. Differential sensor chip 22 is mounted on a die 74 which is further mounted on assembly 20. Die 74 and sensor chip 22 form a barrier between the fluid chamber connection cell 14 and cell 16 (FIG. 2C). A set of electrical leads 76 are bonded on differential sensor chip 22 and are connected to sensor pins 62. Preferably, leads 76 are made of a highly conductive metal such as gold. An electrical insulation shield 78 is mounted on the front of assembly 20 to protect sensor chip 22 and leads 76. Fluid openings 80 are spaced about the outer periphery of shield 78 to allow the oil to act on sensor chip 22 as pressure is transmitted therethrough.

In a specific embodiment, a low pressure access port 82 allows pressure transmitted through isolation diaphragm 42 and port 28 via the silicon oil to act on one side of sensor chip 22. A high pressure access side 84 allows pressure transmitted through isolation diaphragm 34 and port 26 via the silicon oil to act on the opposite side of sensor chip 22.

Figure 3A:
FIG. 3A is a cross-sectional view of an overpressure diaphragm according to the present invention.
Figure 3B:
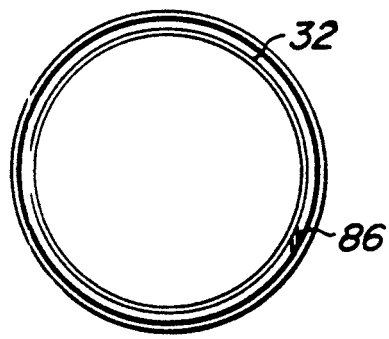
FIG. 3B is a front plan view of the diaphragm in FIG. 3A.

Overpressure diaphragm 32 is illustrated in cross-section in FIG. 3A and in front plan in FIG. 3B. Preferably, overpressure diaphragm 32 is made from a hard metal alloy, such as Alloy Steel A286. After overpressure diaphragm 32 is welded to housing 12, it is solution annealed at 1650 degrees F. for two (2) hours, then aged at 1350 degrees F. for twelve (12) hours. Overpressure diaphragm 32 has a thickness of 0.013 inches, a diameter of 1.88 inches, and a spherical curve of a radius of 12.75 inches such that the deflection between the outside edge and the center is approximately 0.03 inches. At a location on its periphery, a groove 86 is provided that allows the silicon oil trapped under the surface of the diaphragm to flow out to the other side of the cell to provide a void space once the critical overpressure is reached. This design, therefore, allows the chip to withstand a very high differential pressure. With the use of the extra void space created within cell 30 or 38 when the spherical diaphragm collapses, the isolation diaphragm will be supported by the cell because the oil trapped between the isolation diaphragm and the convoluted cylinder surface is to be used to fill the void space just created. Such a design allows the invention to measure and bear high pressures reaching 2250 psia (pounds per square inch absolute). This is limited only to the pressure that the mechanical housing assembly can withstand, and as such, the diaphragm is designed to sustain more than 1500 psia in a preferred mode. It would now be within the ability of one skilled in the art to make an isolation diaphragm according to the present invention.

Figure 4A:
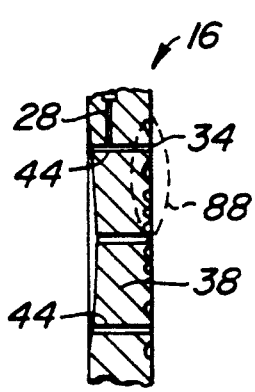
FIG. 4A is a cross-sectional view of a cylinder with an isolation diaphragm according to the present invention.
Figure 4B:
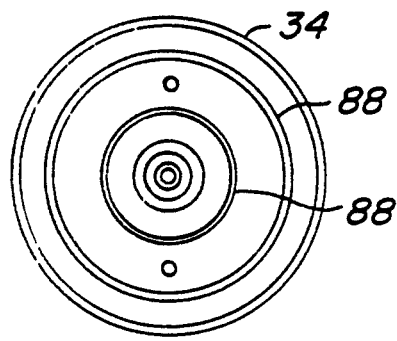
FIG. 4B is a front plan view of the diaphragm in FIG. 4A.

A specific embodiment of cell 16 is illustrated in a cross-sectional side view in FIG. 4A. Shown are cylinder 38, isolation diaphragm 34, channel 44 and port 28. Each isolation diaphragm 34 and 42 is made of a high quality, stiff metal, such as 316L stainless steel. Highlighted on isolation diaphragm 34 are convolutions 88. The outer most convolution 88 is a relatively large annulus (FIG. 4B) that is designed to give diaphragm 34 a spring-rate that allows it to deflect as the outside pressure acts upon it. Its preferred diameter is 1.955 inches. The three smaller convolutions 88 are concentric with the large annulus and are added to stiffen the center of diaphragm 34 to a degree that allows great deflection accuracy over a large pressure and temperature zone. Their preferred dimensions are 0.680 inches. The accuracy is designed to be within $\pm/0.25\%$ over the temperature range of $-20$ to $+250$ degrees F. and with pressures exceeding 1500 psi.

The four diaphragm design in pressure transmitter 10 allows differential pressure sensor chip 22 to be protected from the high overpressure generated by a wide environmental temperature change and/or high line pressure. The overprotection action works as follows: An outside pressure acts on isolation diaphragm 34; this pressure is transferred to pressure sensor chip 22 by means of the silicone oil in cell 14 except overpressure cavity 46. Overpressure diaphragm 32 responds non-linearly to the pressure according to the chart in FIG. 5. When the critical buckling pressure is reached, overpressure diaphragm 32 collapses. This collapsing of diaphragm 32 transfers the oil behind it to cell 16, allowing isolation diaphragm 34 to rest on cylinder 30. The pressure acting on isolation diaphragm 34 is absorbed by cylinder 36, thus protecting differential sensor chip 20. Upon removal of the excess pressure from overpressure diaphragm 32, diaphragm 32 returns to its original position as does isolation diaphragm 34. Should the excess pressure be exerted on isolation diaphragm 42, overpressure diaphragm 40 would collapse in a similar fashion to protect differential sensor chip 20 from the extreme environmental pressure.

Figure 5:
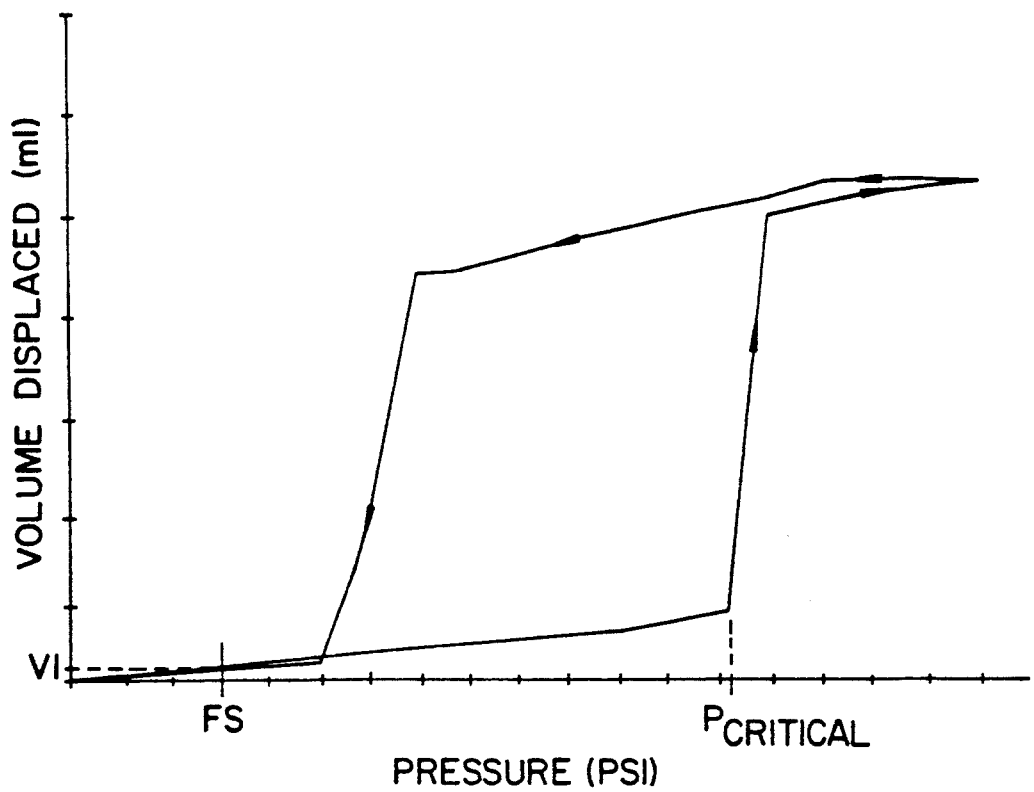
FIG. 5 is a graph showing volume displacement with respect to pressure according to the present invention.

As can be appreciated from the present invention, a relatively small oil volume is required for full scale output by differential sensor chip 20 (V1) as shown in FIG. 5. The critical pressure differential $P_{critical}$ ranges from 8 to 15 psi, depending upon the design and diameter of the convolutions. By increasing the thickness of the overpressure diaphragm and increasing its spherical depth, the diaphragm can withstand as high a pressure as 500 psi before yielding to relieve the excess pressure.

The invention has now been explained with reference to specific embodiments. Other embodiments will be apparent to those of ordinary skill in the art. It is therefore not intended that the invention be limited except as indicated by the appended claims.

What is claimed is:

1. A pressure sensing apparatus having high overpressure protection means, said apparatus comprising:
 a housing having a first cell, a second cell, a sensing chamber, first pressure signal receiving means, and second pressure signal receiving means, each said first and second cell further comprising:
 a cylinder having a first and second face;
 a collapsible overpressure diaphragm mounted on said housing;
 an isolation diaphragm mounted on said second face; and
 channel means coupling said overpressure and isolation diaphragm and coupling one cell to said first pressure signal receiving means, said overpressure diaphragm being further positioned such that an overpressure protection cavity is formed between said overpressure diaphragm and said housing, a first cell cavity further coupled to said second pressure signal receiving means and a second cell cavity further coupled to said first pressure signal receiving means such that when a predetermined pressure is exceeded as applied against said isolation diaphragm and subsequently transmitted to said sensing chamber via said first pressure signal receiving means, said overpressure diaphragm responds non-linearly to said pressure yielding to relieve said first pressure signal receiving means of said pressure.

2. The apparatus in claim 1 further including a second pressure receiving means coupled to the cell other than the cell coupled to the first pressure receiving means via said channel means.

3. The apparatus in claim 1 wherein said overpressure diaphragm includes a spherical portion.

4. The apparatus in claim 1 wherein said predetermined pressure is between about 8 psi and 15 psi.

5. The apparatus in claim 1 wherein said apparatus can withstand an absolute pressure of approximately 2250 psia.

6. The apparatus in claim 1 wherein said overpressure diaphragm is made from Alloy Steel A286.

7. The apparatus in claim 1 wherein said isolation diaphragm comprises a disk having an annulus ridge and includes means allowing said diaphragm to deflect through a predefined distance according to known pressures and temperatures.

8. The apparatus in claim 7 wherein said deflection means includes three concentric annuluses of differing diameters in said diaphragm and all having a diameter less than the diameter of said annulus ridge.

9. The apparatus in claim 1 further including a first pressure cap and a second pressure cap mounted one on said first cell isolation diaphragm and the other on said second cell isolation diaphragm such that a displacement cavity is formed to allow for displacement and pressure media of said isolation diaphragm.

10. The apparatus in claim 1 wherein said first pressure signal receiving means includes a pressure sensor device for measuring the absolute pressure applied to said apparatus, said device is further mounted in said sensor chamber.

11. The apparatus in claim 1 wherein a differential pressure measuring means includes a pressure sensor located in said sensor chamber along a common boundary between said first and second pressure signal receiving means.

12. The apparatus in claim 1 further including a temperature sensor, positioned within said sensor chamber, for providing improved pressure readings based on temperature.

13. A pressure sensing apparatus having high overpressure protection, said apparatus comprising:
a housing having a first cell, a second cell, a sensing chamber, a first and a second pressure signal receiving means, and means for measuring a pressure differential between said first and said second pressure signal means in said sensing chamber, each said first and second cell further comprising:
a cylinder having a first and second face;
a collapsible overpressure diaphragm mounted on said housing;
an isolation diaphragm mounted on said cylinder;
a pressure cap mounted on said cylinder and proximate said isolation diaphragm such that a displacement cavity is formed to allow the displacement of said isolation diaphragm;
channel means coupling said overpressure and isolation diaphragm and further coupling one cell to said first pressure signal means and the other cell to said second signal receiving means, said overpressure diaphragm being further positioned such that an overpressure protection cavity is formed between said overpressure diaphragm and said housing, a first cell cavity further coupled to said second pressure signal means and a second cell cavity further coupled to said first pressure signal means such that when a predetermined absolute pressure is exceeded as applied against said isolation diaphragm and subsequently transmitted to said sensing chamber via one of said pressure signal means, said overpressure diaphragm responds non-linearly to said pressure yielding to allow said isolation diaphragm to contact said cylinder such that said absolute pressure is borne by said cylinder and not said sensing chamber.

14. The apparatus in claim 13 wherein said overpressure diaphragm includes a spherical portion.

15. The apparatus in claim 13 wherein said predetermined absolute pressure is between about 8 psi and 15 psi.

16. The apparatus in claim 13 wherein said apparatus can withstand an absolute pressure approximately 2250 psia.

17. The apparatus in claim 13 wherein said overpressure diaphragm comprises Alloy Steel A286.

18. The apparatus in claim 13 wherein said isolation diaphragm is a disk having an annulus ridge and includes means allowing said diaphragm to deflect through a predefined distance according to known pressures and temperatures.

19. The apparatus in claim 18 wherein said deflection means includes three concentric ridges of different diameters in said diaphragm and all having a diameter less than the diameter of said annulus ridge.

20. The apparatus in claim 13 wherein said first pressure signal receiving means includes a pressure sensor device for measuring the absolute pressure applied to said apparatus, said device is further mounted in said sensor chamber.

21. The apparatus in claim 13 wherein a differential pressure measuring means includes a pressure sensor located in said sensor chamber at a boundary between said first and second pressure signal means.

22. The apparatus in claim 13 further including a temperature sensor, positioned within said sensor chamber, for providing improved pressure readings based on temperature.

23. A pressure sensing apparatus having high overpressure protection means, said apparatus comprising:
a housing having a first cell, a second cell, a sensing chamber, first and second pressure signal means, a differential pressure sensor in said sensing chamber along a boundary between said first and second pressure signal means, each said first and second cell further comprising:
a cylinder having a first and second face;
a collapsible overpressure diaphragm mounted on said housing;
an isolation diaphragm mounted on said second face; and
channel means coupling said overpressure and isolation diaphragm and further coupling one cell to said first pressure signal means and the other cell to said second pressure signal means, said overpressure diaphragm being further positioned such that an overpressure protection cavity is formed between said overpressure diaphragm and said housing, said first cell cavity further coupled to said second pressure signal means and a second cell cavity further coupled to said first pressure signal means such that when said predetermined absolute pressure is exceeded as applied against said isolation diaphragm and subsequently transmitted to said sensing chamber via one of said pressure signal means, said overpressure diaphragm responds non-linearly to said pressure yielding to allow said isolation diaphragm to contact said cylinder such that said absolute pressure is borne by said cylinder and not said sensing chamber.

24. The apparatus in claim 23 wherein said overpressure diaphragm includes a spherical portion.

25. The apparatus in claim 23 wherein said predetermined absolute pressure is between about 8 psi and 15 psi.

26. The apparatus in claim 23 wherein said apparatus can withstand an absolute pressure of approximately 2250 psia.

27. The apparatus in claim 23 wherein said overpressure diaphragm comprises Alloy Steel A286.

28. The apparatus in claim 23 wherein said isolation diaphragm is a disk having an annulus ridge and includes three concentric ridges of differing diameters less than the diameter of said annulus ridge to allow said diaphragm to deflect through a predefined distance according to known pressures and temperatures.

29. The apparatus in claim 23 further including a first pressure cap and a second pressure cap mounted one on said first cell isolation diaphragm and the other on said second cell isolation diaphragm such that a displacement cavity is formed allowing for the displacement of said isolation diaphragm.

30. The apparatus in claim 23 wherein one of said pressure signal means includes a pressure sensor device for measuring the absolute pressure applied to said apparatus, said device is further mounted in said sensor chamber.

31. The apparatus in claim 23 further including a temperature sensor, positioned within said sensor chamber, for providing improved pressure readings based on temperature.

32. A pressure sensing apparatus comprising:
   a housing having a sensing chamber;
   a plurality of cells within said housing; and
   a plurality of pressure signal receiving means within said housing, each of said cells transmitting a pressure to a corresponding pressure signal receiving means;
   wherein each of said cells further comprise:
   a cylinder having a first and second face;
   an isolation diaphragm mounted on said second face;
   a collapsible overpressure diaphragm having a spherical surface integral with a flat outer periphery mounted on said housing and opposite said first face, said overpressure diaphragm being positioned to form an overpressure protection cavity between said overpressure diaphragm and said housing;
   channel means for connecting said isolation and overpressure diaphragm to its pressure signal receiving means, and coupling said overpressure protection cavity to a pressure signal receiving means opposite of its pressure signal receiving means; and
   overpressure protection means for providing overpressure protection for its pressure signal receiving means wherein a predetermined pressure applied to said isolation diaphragm which is transmitted through said channel means causes said collapsible overpressure diaphragm to collapse non-linearly against said housing thereby relieving its pressure signal receiving means of said predetermined pressure.

33. The apparatus in claim 32 wherein said flat outer periphery having a grove thereon which allows a fluid trapped under said peripheral surface to flow out when said overpressure diaphragm collapses thereby allowing said apparatus to withstand high pressures.

34. The apparatus in claim 32 wherein said predetermined pressure is between about 8 psi and 15 psi.

35. The apparatus in claim 32 wherein said isolation diaphragm is supported by said second face when said overpressure diaphragm collapses thereby allowing said apparatus to withstand an absolute pressure of approximately 2,250 psi.

36. The apparatus in claim 32 wherein said isolation diaphragm further comprises a disk having an annulus ridge and deflection means for allowing said diaphragm to deflect through a predefined distance over a desired temperature and pressure range.

37. The apparatus in claim 36 wherein said deflection means has three concentric annuluses of differing diameters within said isolation diaphragm, said three concentric annuluses having a diameter less than the diameter of said annulus ridge.

38. The apparatus in claim 32 further comprising a plurality of pressure caps each mounted to each of said cells over said isolation diaphragm forming a displacement cavity.

39. The apparatus in claim 32 wherein one of said pressure signal receiving means has a pressure sensor device mounted in said sensor chamber for measuring an absolute pressure applied to said apparatus.

40. The apparatus in claim 32 wherein said sensor chamber further comprise a differential pressure measuring means for measuring a pressure difference between each of said pressure signal receiving means for said cells.

41. The apparatus in claim 32 further comprising a temperature sensor within said sensor chamber for providing improved pressure readings based on temperature.

42. A differential pressure sensing apparatus comprising:
   a housing having a first cell, a second cell, and a sensing chamber;
   a first pressure signal receiving means within said housing for receiving signals transmitted by said first cell;
   a second pressure signal receiving means within said housing for receiving signals transmitted by said second cell; and
   a differential pressure measuring means within said sensor chamber for measuring a pressure differential between said first and second pressure signal means;
   wherein each said first and second cell further comprise:
   a cylinder having a first and second face;
   a isolation diaphragm comprising a disk having an annulus ridge and deflection means, said isolation diaphragm being mounted on said second face;
   a collapsible overpressure diaphragm mounted on said housing and opposite said first face, said overpressure diaphragm being positioned to form an overpressure protection cavity between said overpressure diaphragm and said housing;
   channel means for connecting said isolation and overpressure diaphragm to its pressure signal receiving means, and coupling said overpressure protection cavity to the other pressure signal receiving means; and
   overpressure protection means for providing overpressure protection for its pressure signal receiving means wherein a predetermined pressure applied to said isolation diaphragm which is transmitted through said channel means causes said overpressure diaphragm to collapse non-linearly against said housing thereby relieving its pressure signal receiving means of said predetermined pressure.

43. The apparatus in claim 42 wherein said overpressure diaphragm has a spherical surface integral with a flat outer periphery, said flat outer periphery having a grove thereon which allows a fluid trapped under said surface to flow out when said overpressure diaphragm collapses thereby allowing said apparatus to withstand high pressures.

44. The apparatus in claim 42 wherein said predetermined pressure is between about 8 psi and 15 psi.

45. The apparatus in claim 42 wherein said isolation diaphragm is supported by said second face when said overpressure diaphragm collapses thereby allowing said apparatus to withstand an absolute pressure of approximately 2,250 psi.

46. The apparatus in claim 42 wherein said annulus ridge and said deflection means allow said isolation diaphragm to deflect through a predefined distance over a desired temperature and pressure range.

47. The apparatus in claim 46 wherein said deflection means has three concentric annuluses of differing diameters within said isolation diaphragm, said three concentric annuluses having a diameter less than the diameter of said annulus ridge.

48. The apparatus in claim 42 further comprising a plurality of pressure caps each mounted to each of said cells over said isolation diaphragm forming a displacement cavity.

49. The apparatus in claim 42 wherein one of said pressure signal receiving means has a pressure sensor device mounted in said sensor chamber for measuring an absolute pressure applied to said apparatus.

50. The apparatus in claim 42 wherein said sensor chamber further comprise a differential pressure measuring means for measuring a pressure difference between each of said pressure signal receiving means for said cells.

51. The apparatus in claim 42 further comprising a temperature sensor within said sensor chamber for providing improved pressure readings based on temperature.

* * * * *